United States Patent
Horng et al.

(10) Patent No.: US 8,314,562 B2
(45) Date of Patent: Nov. 20, 2012

(54) LAMP

(75) Inventors: Alex Horng, Kaohsiung (TW);
Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 550 days.

(21) Appl. No.: 12/509,724

(22) Filed: Jul. 27, 2009

(65) Prior Publication Data

US 2011/0018445 A1  Jan. 27, 2011

(51) Int. Cl.
*H01J 1/60* (2006.01)
*H01J 7/42* (2006.01)
*H05B 37/04* (2006.01)

(52) U.S. Cl. ......... 315/129; 315/133; 315/136; 315/307

(58) Field of Classification Search .................. None
See application file for complete search history.

(56) References Cited

U.S. PATENT DOCUMENTS

| 3,825,914 | A | 7/1974 | Schacket |
| 5,444,815 | A | 8/1995 | Lee et al. |
| 6,220,722 | B1 | 4/2001 | Begemann |
| 6,448,715 | B1 * | 9/2002 | Fujiwara et al. ............... 315/129 |
| 2004/0032225 | A1 * | 2/2004 | Chang ............................ 315/291 |
| 2004/0080715 | A1 * | 4/2004 | Miyashita et al. .............. 353/30 |
| 2007/0040696 | A1 * | 2/2007 | Mubaslat et al. ............. 340/657 |

* cited by examiner

*Primary Examiner* — Anh Tran (74) *Attorney, Agent, or Firm* — Muncy, Geissler, Olds & Lowe, PLLC (57) ABSTRACT

A lamp includes a lighting module providing illumination, a control unit, and a detecting unit. The control unit is connected or not connected to the lighting module. The detecting unit is coupled to the control unit. The detecting unit detects operational statuses of the lighting module and sends a detection result to the control unit. The control unit controls the lighting module or an alarm unit to enter an alarm mode based on the detection result. A user can immediately know the operational statuses by the alarm unit and take necessary actions to assure normal operation of the lamp.

8 Claims, 6 Drawing Sheets

LAMP

BACKGROUND OF THE INVENTION

1. Field of the Invention

The present invention relates to a lamp and, more particularly, to a lamp capable of detecting operational statuses thereof at any time and immediately providing alarming effects.

2. Description of the Related Art

Conventional lamps include a lighting module having a lighting element, such as a light-emitted diode, a light bulb, or a light tube, to emit light beams for illumination. However, each of the lamps is liable to malfunction and has a shortened service life due to overheating of the lighting element. Fins or heat-dissipating fans have been proposed to avoid high heat during operation of the lighting module.

Figure 1:
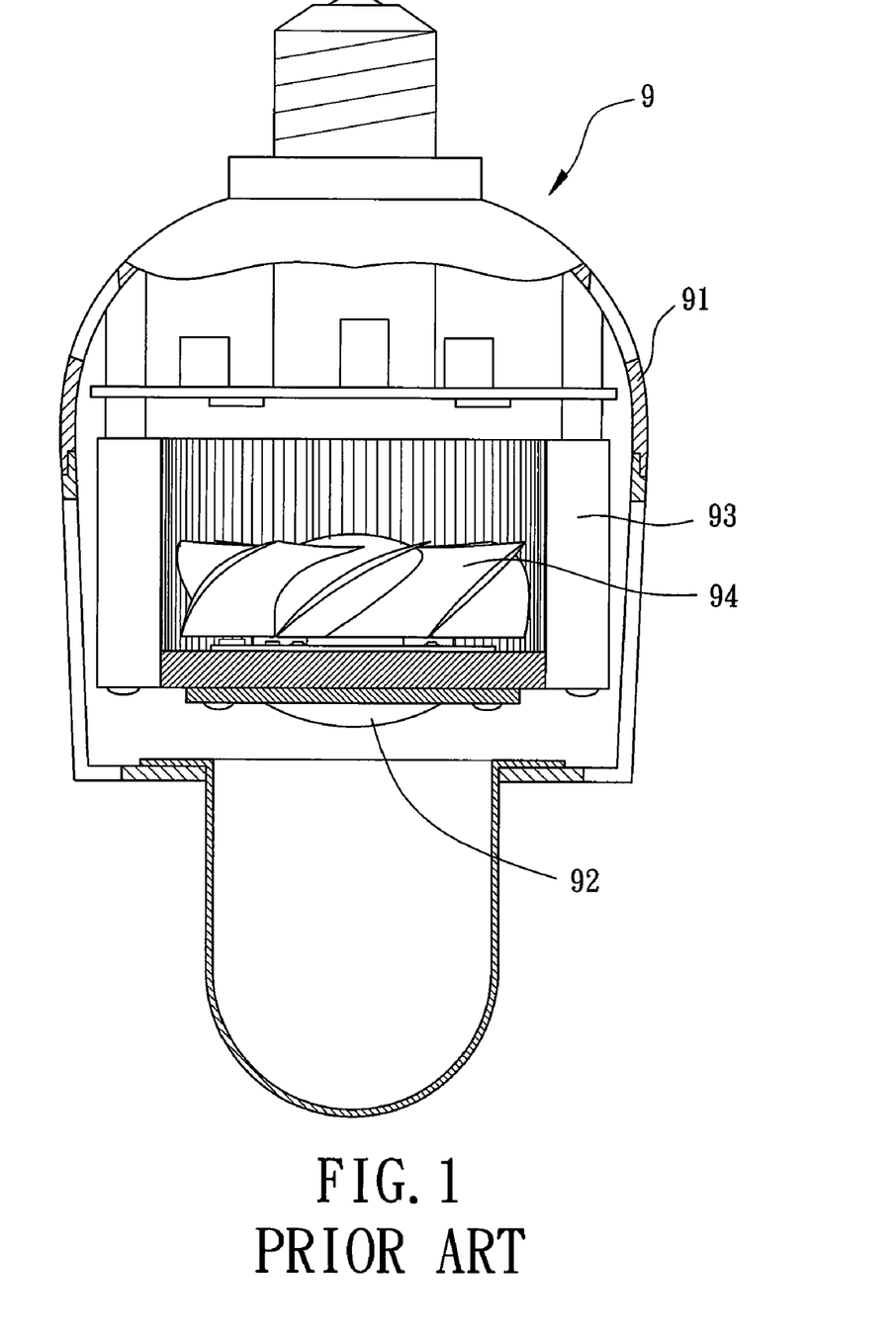
FIG. 1 shows a perspective view of a conventional lamp with a heat-dissipating fan with a portion of the lamp cross sectioned.

FIG. 1 shows a conventional lamp 9 including a light-transmittable hollow housing 91. A lighting module 92 is received in the housing 91 for illuminating purposes. A fin 93 is coupled to the lighting module 92 for absorbing heat generated by the lighting module 92 during operation. A heat-dissipating fan 94 is coupled to the fin 93 and capable of driving air currents to pass through the fin 93, providing rapid heat exchange between the fin 93 and the air currents and lowering the temperature of the lighting module 92. Thus, the service life of the lighting module 92 can be prolonged.

The brightness of the lamp is the main factor of illumination and the indoor atmosphere. Although the fin 93 and the heat-dissipating fan 94 can maintain normal operation of the lighting module 92 of the lamp 9, the service life of the lighting module 92 is still limited. For example, the service life of a tungsten filament bulb is about 1000 hours. The lamp 9 can only be replaced after the lighting module 92 is damaged, for the lamp 9 does not include the function of reminding the user of replacing the lighting module 92. Many problems occur accordingly. Specifically, the lighting module 92 that has served more than its service life consumes more energy and can not provide the required illumination effect, harming the eyes of the user. Furthermore, the user can not immediately replace the damaged lighting module 92 if the user forgets to prepare a spare one, which occurs frequently. Further, dust easily accumulates at the fin 93 and the heat-dissipating fan 94 and, thus, adversely affects the overall heat-dissipating effect. The lamp 9 can not remind the user of abnormal operation of the fin 93 and/or the heat-dissipating fan 94, either. The service life of the lamp 9 will be shortened due to overheating if the user fails to maintain or replace the fin 93 and/or the heat-dissipating fan 94.

SUMMARY OF THE INVENTION

The primary objective of the present invention is to provide a lamp capable of detecting operational statuses of the lamp, so that the user can immediately take necessary actions in response to the detection results.

In a first aspect, the lamp includes a lighting module, a control unit, and a detecting unit. The control unit is coupled to the lighting module and includes an estimated lifetime of the lighting module. The detecting unit is coupled to the control unit. The detecting unit detects and calculates a total operation time of the lighting module and sends a detection result to the control unit. The control unit compares the detection result with the estimated lifetime and controls the lighting module to enter an alarm mode once the detection result reaches the estimated lifetime.

In a second aspect, the lamp includes a lighting module, a control unit, a detecting unit, and an alarm unit. The lighting module includes a lighting element and a control circuit coupled to the lighting element. The control unit includes an estimated lifetime of the lighting module. The detecting unit and the alarm unit are both coupled to the control unit. The detecting unit detects and calculates a total operation time of the lighting module and sends a detection result to the control unit. The control unit compares the detection result with the estimated lifetime and controls the alarm unit to enter an alarm mode once the detection result reaches the estimated lifetime.

In a third aspect, a lamp includes a lighting module, a control unit, a detecting unit, and a heat-dissipating module. The lighting module includes a lighting element and a control circuit coupled to the lighting element. The control unit includes a normal operation temperature threshold of the lighting module. The detecting unit is coupled to the control unit. The heat-dissipating module is coupled to the lighting module. The detecting unit detects temperature of the lighting module during operation and sends a detection result to the control unit. The control unit compares the detection result with the normal operation temperature threshold and controls the lighting module to enter an alarm mode when the detection result is equal to or higher than the normal operation temperature threshold.

In a fourth aspect, the lamp includes a lighting module, a control unit, a detecting unit, an alarm unit, and a heat-dissipating unit. The lighting module includes a lighting element and a control circuit coupled to the lighting element. The control unit includes a normal operation temperature threshold of the lighting module. The detecting unit and the alarm unit are both coupled to the control unit. The heat-dissipating module is coupled to the lighting module. The detecting unit detects temperature of the lighting module during operation and sends a detection result to the control unit. The control unit compares the detection result with the normal operation temperature threshold and controls the alarm unit to enter an alarm mode when the detection result is equal to or higher than the normal operation temperature threshold.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
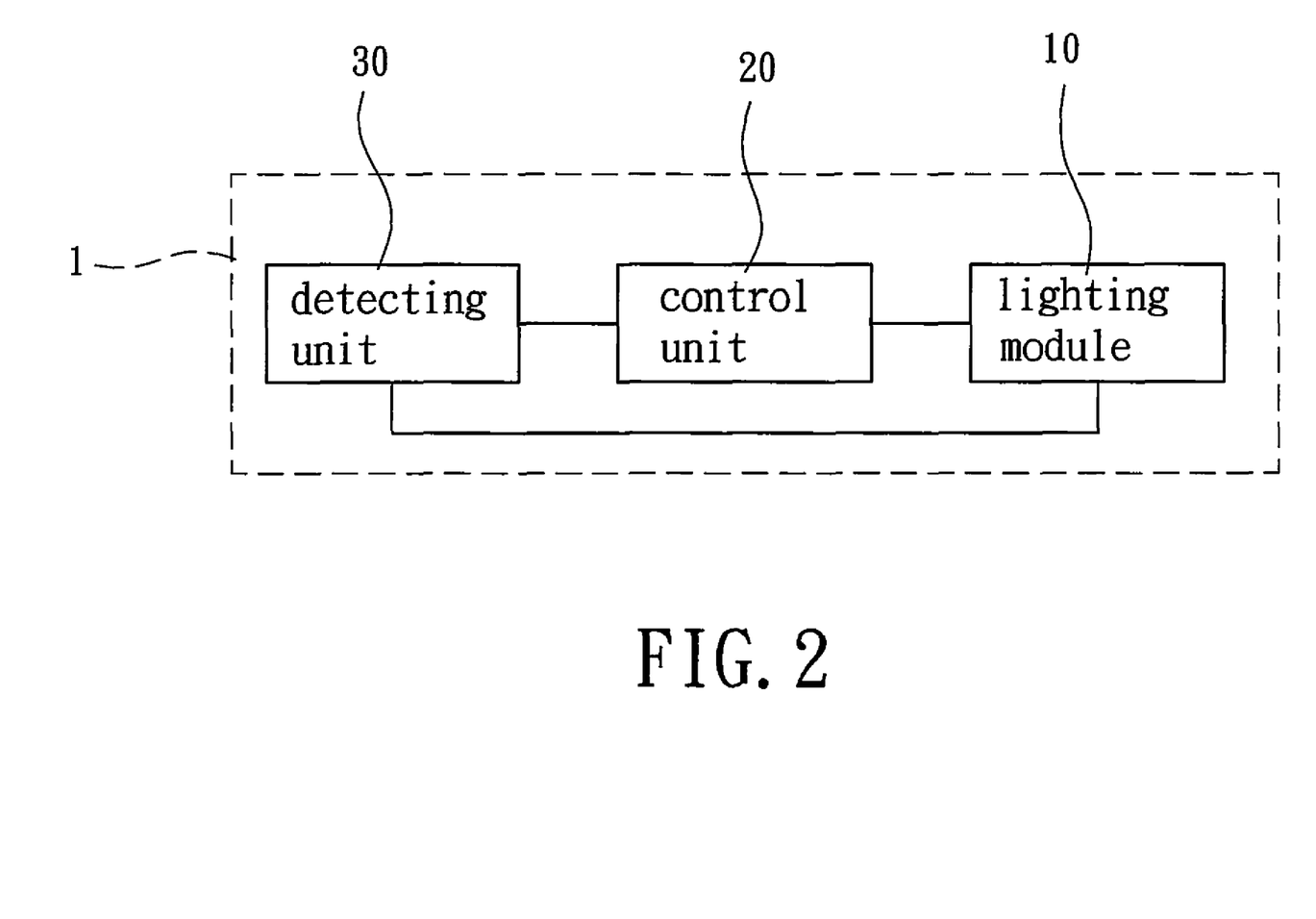
FIG. 2 shows a block diagram of a lamp according to the preferred teachings of the present invention.

A lamp according to the preferred teachings of the present invention is shown in FIG. 2 and generally designated 1. The lamp 1 includes a lighting module 10, a control unit 20, and a detecting unit 30. The lighting module 10 produces light beams to provide illumination. The control unit 20 is coupled to the lighting module 10. The detecting unit 30 is coupled to the control unit 20 and detects various operational statuses of the lighting module 10, including whether the lighting module 10 has reached its service life, whether the temperature of the lighting module 10 is too high, etc. The control unit 20 can send a control signal to the lighting module 10 based on the detection result so that the lighting module 10 or an alarm unit enters an alarm mode, reminding a user to replace the lighting module 10 or maintain the lamp 1. It can be appreciated that the control unit 20 does not have to be connected to the lighting module 10, which will be described later.

Figure 3:
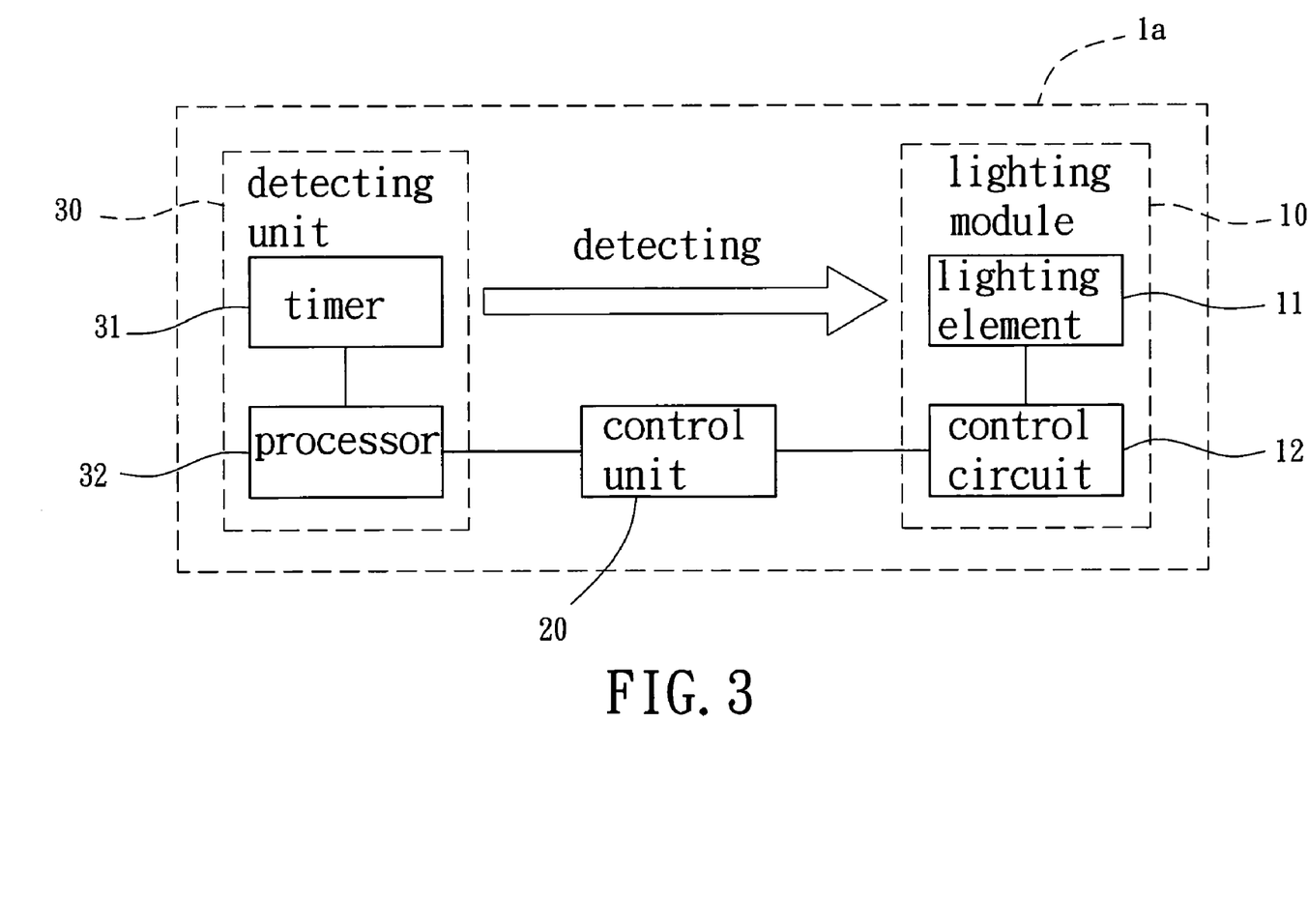
FIG. 3 shows a block diagram illustrating structure of a first example of the lamp according to the preferred teachings of the present invention.

In a first example shown in FIG. 3, the lamp 1a includes a lighting module 10, a control unit 20, and a detecting unit 30. The lighting module 10 includes a lighting element 11 and a control circuit 12. The lighting element 11 can be a light-emitted diode (LED), a light bulb, a light tube, or any element capable of providing illuminating function. The control circuit 12 is coupled to the lighting element 11 for controlling emission of light beams from the lighting element 11. The control circuit 12 can be in "direct" connection with the lighting element 11 such as by wires. Alternatively, the control unit 12 can be in "indirect" connection with the lighting element 11 such as by signal transmission. Preferably, the lighting module 10 can be coupled with a heat-dissipating module to avoid overheating during operation. Furthermore, the control circuit 12 can be incorporated into the control unit 20 rather than the lighting module 10.

The control unit 20 is coupled to the control circuit 12 of the lighting module 10, so that the lighting element 11 can enter the alarm mode under control of the control circuit 12. In a case that the control circuit 12 is incorporated in the control unit 20, the control unit 20 can directly switch the lighting element 11 into the alarm mode. Furthermore, the control unit 20 can include data of estimated lifetime of the lighting element 11. The estimated lifetime of the lighting element 11 can be the average life after testing and estimation. For example, the average life is about 1,000 hours for a tungsten filament bulb, about 8,000 hours for a fluorescent tube, and about 10,000 hours for an LED. The estimated lifetime can be set as the same or slightly longer or shorter than the average life. As an example, assume the average life of the lighting element 11 is 1,000 hours, the estimated lifetime can be set as 980, 990, 1000, or more than 1000 hours.

The detecting unit 30 detects whether the lighting module 10 has reached its service life. Specifically, the total operation time of the lighting module 10 is calculated by the detecting unit 30, and a detection result indicative of the total operation time is sent to the control unit 20. More specifically, the total operation time of the lighting module 10 is calculated since the first time it is activated. The detecting unit 30 can be electrically connected to the lighting module 10 and calculate the total operation time of the lighting module 10. However, the detecting unit 30 can calculate the total operation time of the lighting module 10 without in direct, electrical connection with the lighting module 10. As an example, the detecting unit 30 can include a photo sensor to sense whether the lighting module 10 is activated, thereby calculating the total operation time of the lighting module 10.

The detecting unit 30 preferably includes a timer 31 and a processor 32. The timer 31 is coupled to the lighting module 10 to calculate the total operation time of the lighting module 10. The processor 32 is coupled to the timer 31 and the control unit 20, so that a detection result can be generated based on the total operation time obtained from the timer 31 and sent to the control unit 20. It can be appreciated that the processor 32 can be incorporated in the control unit 20 rather than the detecting unit 30.

In use of the lamp 1a according to the preferred teachings of the present invention, the timer 31 calculates the operation time each time the lighting module 10 operates, and the total operation time is calculated. The timer 31 can include or be coupled to a display to show the total operation time of the lighting module 10. Thus, the service life of the lighting module 10 can be monitored by the user through the display. The processor 32 generates a detection result based on the total operation time and sends the detection result to the control unit 20. As an example, assume the estimated lifetime is set as 1,000 hours, and the total operation time calculated by the timer 31 is also 1,000 hours, the control unit 20 sends a control signal to the control circuit 12 after comparing the estimated lifetime with the total operation time. Thus, the lighting element 11 can enter the alarm mode under control of the control circuit 12 once the total operation time reaches the estimated lifetime.

The alarm mode can be in any desired form. As an example, the brightness of the lighting element 11 can be reduced by half under control of the control unit 20 through the control circuit 12. In another example, the lighting element 11 flickers under control of the control unit 20 through the control circuit 12. In a further example, if the lighting element 11 is an LED and enters the alarm mode, the lighting element 11 can emit light beams of a color different from an original color of light beams that the lighting element 11 emits before entering the alarm mode. Thus, the user can see the change of the lighting element 11 and, thus, be aware of the fact that the lighting module 10 has reached its service life and, thus, must be replaced to maintain the illumination quality.

Figure 4:
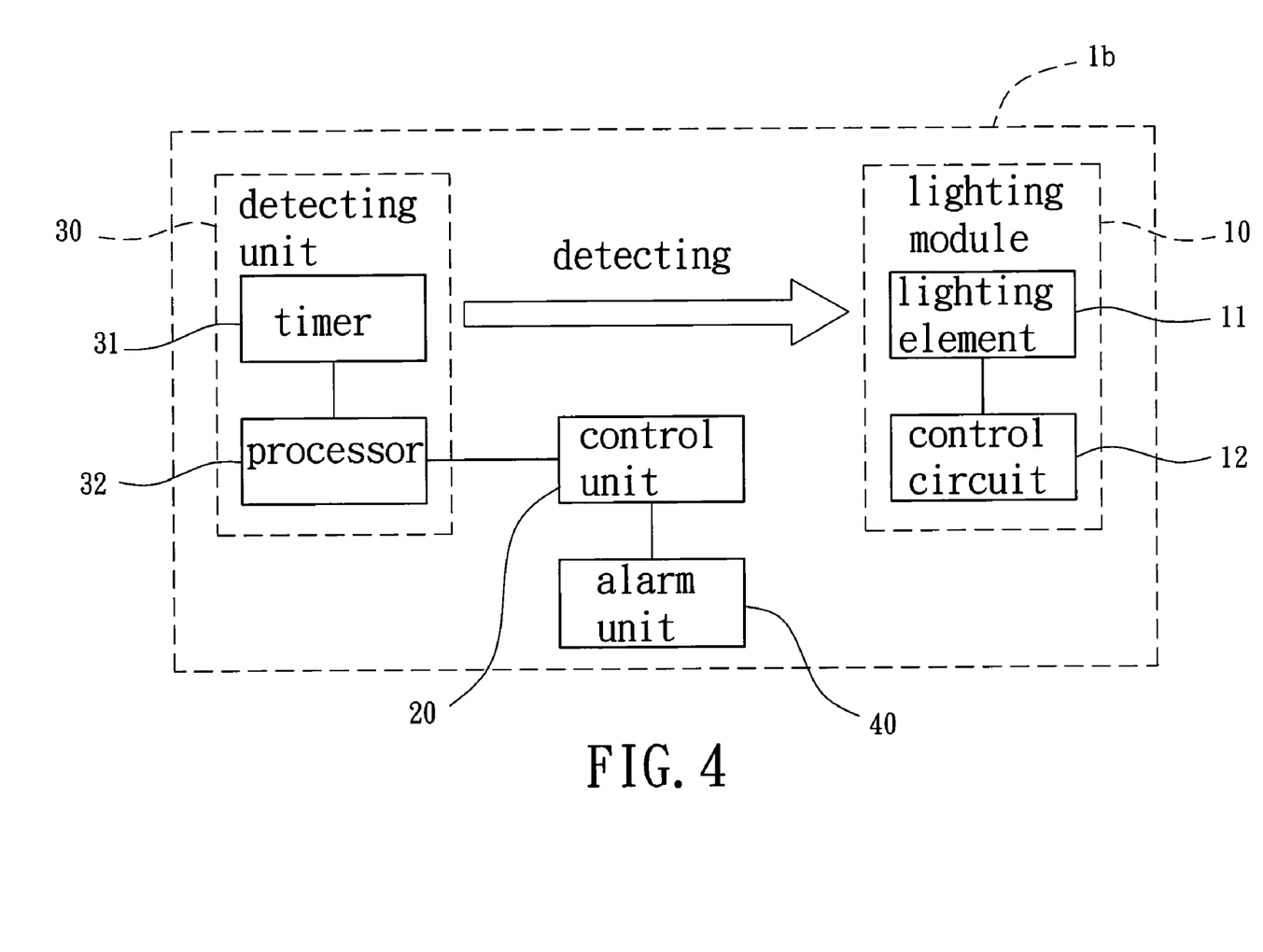
FIG. 4 shows a block diagram illustrating structure of a second example of the lamp according to the preferred teachings of the present invention.

In a second example shown in FIG. 4, the lamp 1b includes a lighting element 10, a control unit 20, a detecting unit 30, and an alarm unit 40. The lighting module 10, the control unit 20, and the detecting unit 30 are identical to those of the first example and, therefore, not described in detail to avoid redundancy. Compared to the lamp 1a of the first example, the control unit 20 of the lamp 1b of the second example does not have to be connected to the control circuit 12 of the lighting module 10.

The alarm unit 40 is directly or indirectly connected to the control unit 20. The alarm unit 40 can be at least one LED (or at least one light bulb or at least one light tube), a sound generator (such as a buzzer, a speaker, or a beeper), or any other element capable of generating sound or light effect.

In use of the lamp 1b of the second example according to the preferred teachings of the present invention, the detecting unit 30 calculates the total operation time of the lighting module 10 and generates a detection result to the control unit 20. The control unit 20 compares the detection result with the estimated lifetime and sends a control signal to the alarm unit 40 to switch the alarm unit 40 into an alarm mode once the detection result reaches the estimated lifetime.

The alarm mode can be in any desired form. As an example, in the case that the alarm unit 40 includes a plurality of LEDs capable of emitting different colors, the LEDs can emit green light to indicate that the lighting element 11 has not reached its service life, emit yellow light to indicate that the lighting element 11 is going to reach its service life, or emit red light to indicate that the lighting element 11 has reached its service life. In another case that the alarm unit 40 is a single LED, the control unit 20 can control the LED to reduce the brightness by half, to flicker, or to emit light beams of a specific color different from an original color of light beams emitted before the alarm unit 40 enters the alarm mode, so as to indicate that the lighting element 11 has reached its service life. In another case that the alarm device 40 is a sound generator, the control unit 20 can control the sound generator to generate sound to remind the user that the lighting element 11 has reached its service life. Thus, through use of the alarm unit 40, the user can immediately replace the lighting module 10 to maintain the illumination quality.

Figure 5:
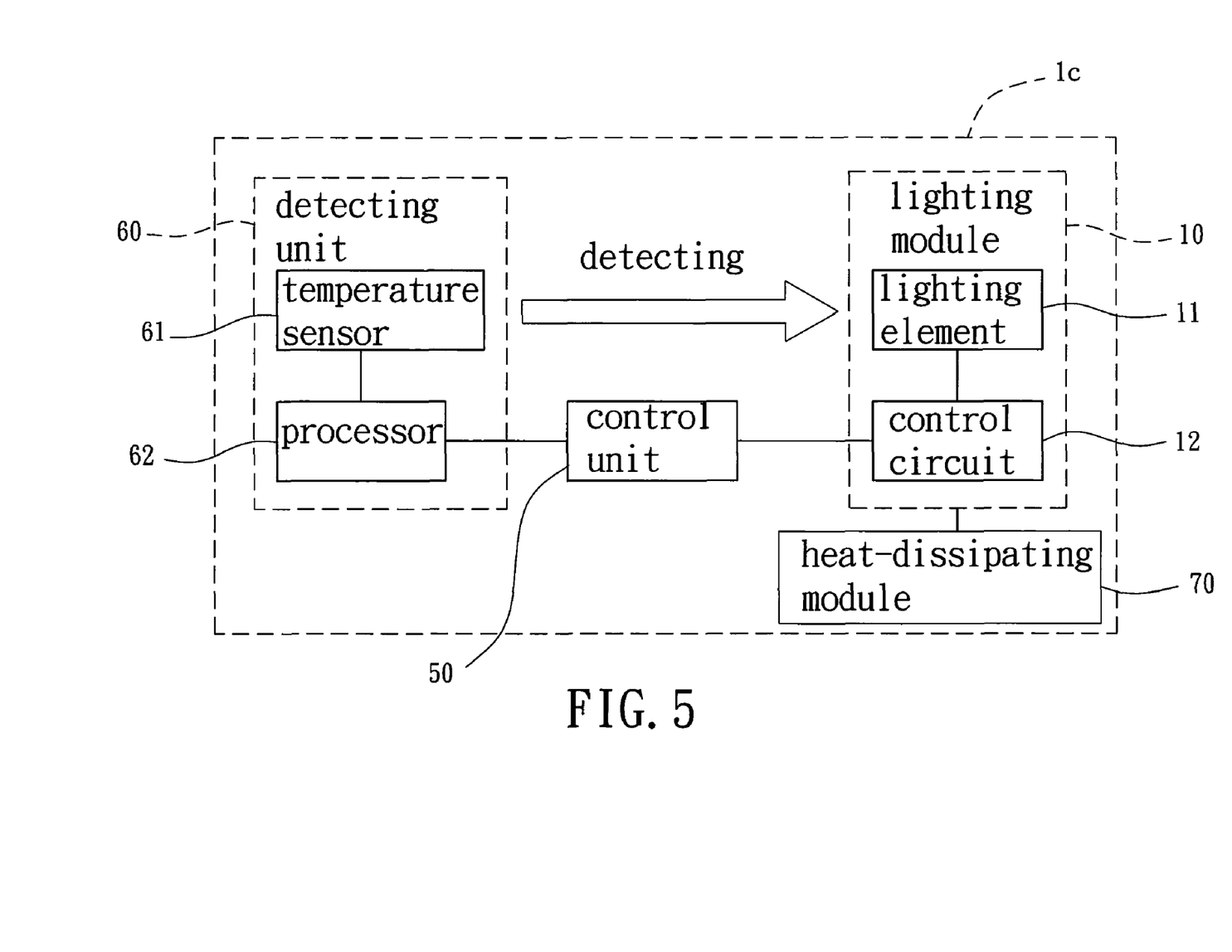
FIG. 5 shows a block diagram illustrating structure of a third example of the lamp according to the preferred teachings of the present invention.

In a third example shown in FIG. 5, the lamp 1c according to the preferred teachings of the present invention includes a lighting module 10, a control unit 50, a detecting unit 60, and a heat-dissipating module 70. The lighting module 10 is identical to that of the first embodiment and, therefore, not described in detail to avoid redundancy.

The control unit 50 is connected to the control circuit 12 of the lighting module 10 for switching the lighting element 11 into the alarm mode. It can be appreciated that the control unit 12 can be incorporated in the control unit 50 rather than the lighting module 10. The control unit 50 includes a normal operation temperature threshold that is the normal temperature during actual operation of the lighting element 11. For example, when it was found that the lighting element 11 was liable to be damaged when the operational temperature exceeds 50° C., the normal operation temperature threshold is set as 50° C. or a temperature range around 50° C.

The detecting unit 60 detects the temperature of the lighting module 10 and is connected to the control unit 50. The detecting unit 60 includes a temperature sensor 61 and a processor 62 coupled to the temperature sensor 61 and the control unit 50. The temperature sensor 61 senses the temperature of the lighting element 11 during operation. The processor 62 receives the temperature of the lighting element 11 sensed by the temperature sensor 61 and generates a control signal that is sent to the control unit 50. It can be appreciated that the processor 62 can be incorporated in the control unit 50 rather than the detection unit 60.

The heat-dissipating module 70 is coupled to the lighting module 10 to avoid overheating of the lighting module 10 during operation. The heat-dissipating module 70 preferably includes a fin and a heat-dissipating fan mounted to the fin. The heat generated by the lighting element 11 is transmitted to the fin and then dissipated by the heat-dissipating fan driving air currents pass through the fin. Thus, heat exchange can be conducted between the fin and the air currents, enhancing the overall heat-dissipating effect.

In use of the lamp 1c according to the preferred teachings of the present invention, the temperature sensor 61 of the detecting unit 60 continuously senses the temperature of the lighting module 10, and the processor 62 generates a detection result based on the temperature sensed. The detection result is sent to the control unit 50. As an example, if the normal operation temperature threshold is set as 50° C., the actual temperature of the lighting element 11 will not exceed 50° C. during normal operation due to heat dissipation provided by the heat-dissipating module 70. However, when the heat-dissipating module 70 fails to provide the required heat-dissipating effect or when the fin could not provide the normal heat-dissipating effect due to accumulation of dust, the temperature of the lighting element 11 may exceed 50° C. The control unit 50 sends a control signal to the control circuit 12 when the temperature sensed by the temperature sensor 61 is higher than the normal operation temperature threshold, so that the lighting element 11 enters the alarm mode. The alarm mode can be of any form, as mentioned above. The user can see the change of the lighting element 11 and, thus, be aware of the fact that the lighting module 10 has reached its service life and, thus, must be replaced to maintain the illumination quality.

The control unit 50 is preferably coupled to the heat-dissipating module 70 to control the operation mode of the heat-dissipating module 70, As an example, when the heat-dissipating effect is adversely affected by dust accumulates at the fin after a period of time of operation, the control unit 50 can send a control signal to the control circuit 12 when the detection result (i.e., the temperature sensed) exceeds the normal operation temperature threshold. This control signal can control the heat-dissipating fan of the heat-dissipating module 70 to rotate in a reverse direction, so that the dust accumulated at the fin can be removed. After that, the control circuit 12 controls the heat-dissipating fan to rotate in the original direction. Alternatively, this control signal can control the heat-dissipating fan to rotate at higher speeds to increase the amount of air for enhancing the heat-dissipating effect. Thus, the temperature of the lighting element 11 can be effectively lowered, assuring normal operation of the lighting element 11.

Figure 6:
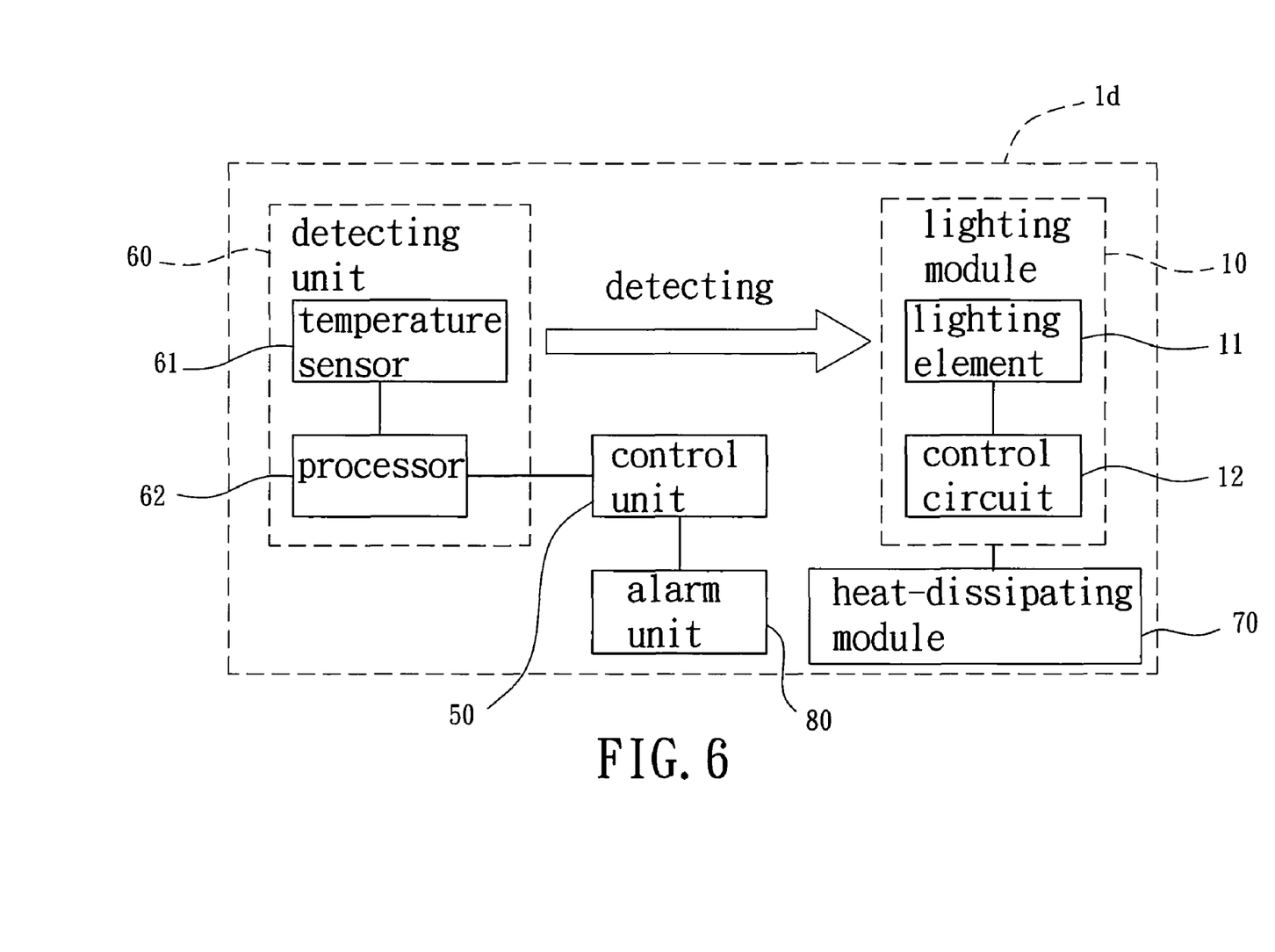
FIG. 6 shows a block diagram illustrating structure of a fourth example of the lamp according to the preferred teachings of the present invention.

In a fourth example, a lamp 1d according to the preferred teachings of the present invention includes a lighting module 10, a control unit 50, a detecting unit 60, a heat-dissipating module 70, and an alarm unit 80. The lighting module 10, the control unit 50, the detecting unit 60, and the heat-dissipating module 70 are identical to those of the third embodiment and, therefore, not described in detail to avoid redundancy. Compared to the lamp 1c of the third example, the control unit 50 of the lamp 1d of the fourth example does not have to be connected the control circuit 12.

The alarm unit 80 is coupled to the control unit 50. The alarm unit 80 can be at least one LED (or at least one light bulb or at least one light tube), a sound generator (such as a buzzer, a speaker, or a beeper), or any other element capable of generating sound or light effect.

In use of the lamp 1d of the fourth example according to the preferred teachings of the present invention, the detecting unit 60 senses the temperature of the lighting module 10, and a detection result is sent to the control unit 50. When the detection result exceeds the normal operation temperature threshold, the control unit 50 sends a control signal to the alarm unit 80 to switch the alarm unit 80 into an alarm mode. The alarm mode can be in any desired form, and discussion of which has been made with reference to the second example. Thus, through use of the alarm unit 80, the user can immediately replace the lighting module 10 to maintain the illumination quality.

According to the above, the lamp 1a, 1b, 1c, 1d according to the preferred teachings of the present invention provides several advantages. Specifically, the user is reminded that the lighting element 11 of the lighting module 10 is close to the service life by switching the lighting module 10 or the alarm unit 40, 80 into one of a plurality of alarm modes under control of the control unit 20, 50. Thus, the user can immediately replace the lighting element 11 with a new one, saving energy by avoiding consumption of more energy by the lighting module 10 that has exceeded its service life. Furthermore, the replacement of the lighting module 10 reaching its service life assures the desired illumination effect. Further, the user can prepare a spare lighting element at the time he or she is reminded by the alarm mode, so that the lighting element 11, when damaged, can be immediately replaced with the spare one. Further, the heat-dissipating effect of the heat-dissipating module 10 can immediately be monitored through the alarm mode, avoiding overheating of the lighting module 10 and, thus, prolonging the service life of the lamp 1a, 1b, 1c, 1d according to the preferred teachings of the present invention.

As mentioned above, the operational statuses of the lamp 1a, 1b, 1c, 1d according to the preferred teachings of the present invention can reliably be detected, so that the user can take necessary actions in response to the operational statuses. Normal operation and quality of the lamp 1a, 1b, 1c, 1d are assured.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A lamp comprising:
    a lighting module;
    a control unit coupled to the lighting module, with the control unit including an estimated lifetime of the lighting module; and
    a detecting unit coupled to the control unit, with the detecting unit detecting and calculating a total operation time of the lighting module and sending a detection result to the control unit, with the control unit comparing the detection result with the estimated lifetime and controlling the lighting module to enter an alarm mode once the detection result reaches the estimated lifetime, with the control unit controlling the lighting module to emit light beams of a color different from an original color and to reduce brightness of the lighting module by half after entering the alarm mode, with lighting element emitting light beams of the original color before entering the alarm mode.

2. The lamp as claimed in claim 1, with the detecting unit including a timer and a processor, with the timer coupled to the lighting module and calculating the total operation time of the lighting module, with the processor coupled to the timer and the control unit, and with the processor sending the detection result to the control unit based on the total operation time.

3. The lamp as claimed in claim 1, with the lighting module including a lighting element and a control circuit, with the control circuit coupled to the lighting element, and with the control unit coupled to the control circuit.

4. The lamp as claimed in claim 1, further comprising: a heat-dissipating module coupled to the lighting module.

5. A lamp comprising:
    a lighting module including a lighting element and a control circuit coupled to the lighting element;
    a control unit including an estimated lifetime of the lighting module;
    a detecting unit coupled to the control unit; and
    an alarm unit coupled to the control unit,
    with the detecting unit detecting and calculating a total operation time of the lighting module and sending a detection result to the control unit, with the control unit comparing the detection result with the estimated lifetime and controlling the alarm unit to enter an alarm mode once the detection result reaches the estimated lifetime, with the alarm unit including a plurality of light-emitted diodes, with the lighting element emitting light beams of an original color before the alarm unit enters the alarm mode, with the control unit controlling the plurality of light-emitted diodes to emit light beams of a color different from the original color and to reduce brightness of the light-emitted diode by half after the alarm unit enters the alarm mode.

6. The lamp as claimed in claim 5, with the detecting unit including a timer and a processor, with the timer coupled to the lighting module and calculating the total operation time of the lighting module, with the processor coupled to the timer and the control unit, and with the processor sending the detection result to the control unit based on the total operation time.

7. The lamp as claimed in claim 5, with the alarm unit including a sound generator, with the control unit controlling the sound generator to generate sound to enter the alarm mode.

8. The lamp as claimed in claim 5, further comprising: a heat-dissipating module coupled to the lighting module.

* * * * *